United States Patent
Lee et al.

(10) Patent No.: US 9,239,594 B2
(45) Date of Patent: Jan. 19, 2016

(54) DISPLAY DEVICE AND METHOD OF CONTROLLING THE SAME

(71) Applicant: Samsung Display Co., Ltd., Yongin-si, Gyeonggi-do (KR)

(72) Inventors: Yong-Joon Lee, Yongin-si (KR); Hae-Kang Lee, Yongin-si (KR); Ji-Soo Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 206 days.

(21) Appl. No.: 13/659,571

(22) Filed: Oct. 24, 2012

(65) Prior Publication Data

US 2013/0307816 A1    Nov. 21, 2013

(30) Foreign Application Priority Data

May 15, 2012 (KR) .................. 10-2012-0051654

(51) Int. Cl.
*G06F 1/16* (2006.01)
*G06F 3/0488* (2013.01)

(52) U.S. Cl.
CPC ............ *G06F 1/1652* (2013.01); *G06F 1/1677* (2013.01); *G06F 1/1684* (2013.01); *G06F 3/04886* (2013.01)

(58) Field of Classification Search
CPC ................................................... G06F 1/1652
See application file for complete search history.

(56) References Cited

U.S. PATENT DOCUMENTS

| | | | |
|---|---|---|---|
| 5,907,375 A * | 5/1999 | Nishikawa et al. | ............ 349/12 |
| 6,903,927 B2 | 6/2005 | Anlauff | |
| 7,109,967 B2 * | 9/2006 | Hioki et al. | ............ 345/104 |
| 7,408,698 B2 * | 8/2008 | Kuo et al. | ............ 359/296 |
| 8,271,047 B2 * | 9/2012 | Kim et al. | ............ 455/566 |
| 2007/0188179 A1 * | 8/2007 | Deangelis et al. | ............ 324/661 |
| 2010/0117975 A1 * | 5/2010 | Cho | ............ 345/173 |
| 2010/0120470 A1 | 5/2010 | Kim et al. | |
| 2010/0141605 A1 | 6/2010 | Kang et al. | |
| 2010/0164888 A1 * | 7/2010 | Okumura et al. | ............ 345/173 |

(Continued)

FOREIGN PATENT DOCUMENTS

| | | |
|---|---|---|
| KP | 10-2010-0065418 | 6/2010 |
| KR | 10-0552055 | 2/2006 |

(Continued)

OTHER PUBLICATIONS

Korean Office Action dated Aug. 22, 2013 issued in Korean Priority Application No. 10-2012-0051654, 4 pages.

(Continued)

*Primary Examiner* — Jason Olson
(74) *Attorney, Agent, or Firm* — Christie, Parker & Hale, LLP

(57) ABSTRACT

A display device and a method of controlling the display device are provided. The display device includes: a display unit for displaying visual information to a user on an overall screen region, and being configured to bend with respect to a bending portion between screen regions of the overall screen region that display the visual information; a pressure sensor a location corresponding to the bending portion, and being configured to sense a first pressure applied to the bending portion when the display unit is bent with respect to the bending portion; and a control unit for controlling the visual information provided through the display unit based on sensing information transferred from the pressure sensor.

14 Claims, 7 Drawing Sheets

(56) References Cited

U.S. PATENT DOCUMENTS

2010/0182265 A1    7/2010  Kim et al.
2011/0216064 A1*   9/2011  Dahl et al. .................... 345/428
2014/0062255 A1*   3/2014  Reed et al. .................... 310/311

FOREIGN PATENT DOCUMENTS

| KR | 10-2009-0087303 | 8/2009 |
|----|-----------------|--------|
| KR | 10-2010-0052226 | 5/2010 |
| KR | 10-2010-0082451 | 7/2010 |

OTHER PUBLICATIONS

Korean Patent Abstract Publication No. 1020000021342 A, dated Apr. 25, 2000 for KR 10-0552055 listed above, 1 page.
Webpage: http://www.tagstory.com/video/video_post.aspx?media_id=V000370619; 1 page.

* cited by examiner (a)

(b)

DISPLAY DEVICE AND METHOD OF CONTROLLING THE SAME

CROSS-REFERENCE TO RELATED PATENT APPLICATION

This application claims priority to and the benefit of Korean Patent Application No. 10-2012-0051654, filed on May 15, 2012, in the Korean Intellectual Property Office, the entire content of which is incorporated herein by reference.

BACKGROUND

1. Field

Aspects of embodiments of the present invention relate to a display device and a method of controlling the display device.

2. Description of the Related Art

Mobility based electronic devices are widely used. Recent examples of mobile electronic devices include tablet PCs, in addition to small electronic devices such as mobile phones.

Such mobile electronic devices include a display unit to provide users with visual information such as images in order to assist various functions. As the equipment for driving the display unit has become smaller, the proportion of space occupied by the display unit to that of the mobile electronic device has gradually increased.

SUMMARY

Embodiments of the present invention provide for a display device and a method of controlling the display device. More particularly, embodiments of the present invention provide for a display device having a structure in which the display unit may be bent or folded to a set angle (for example, a predetermined angle) or unbent to a flat state.

In an exemplary embodiment of the present invention, a display device is provided. The display device includes: a display unit for displaying visual information to a user on an overall screen region, and being configured to bend with respect to a bending portion between screen regions of the overall screen region that display the visual information; a pressure sensor at a location corresponding to the bending portion, and being configured to sense a first pressure applied to the bending portion when the display unit is bent with respect to the bending portion; and a control unit for controlling the visual information provided through the display unit based on sensing information transferred from the pressure sensor.

The pressure sensor may be a flexible film pressure sensor.

The pressure sensor may be transparent.

The pressure sensor may include a piezo resistance based sensor.

The bending portion may span the display unit.

The pressure sensor may be further configured to sense a second pressure applied when the display unit that is bent with respect to the bending portion is then unbent with respect to the bending portion.

The control unit may be configured to control the display unit to display different types of the visual information on a first screen region and a second screen region of the screen regions of the display unit that is bent with respect to the bending portion.

The control unit may be further configured to control the display unit to display a control screen on the second screen region that is used to manipulate an application being displayed on the first screen region, or to display a thumbnail image on the second screen region that is a summary of content related to a document being displayed on the first screen region.

The control unit may be further configured to control the display unit to display on the overall screen region one of the different types of the visual information of the application being displayed on the first screen region based on a sensing signal of the pressure sensor generated when display unit that is bent with respect to the bending portion is then unbent with respect to the bending portion to be flat.

The control unit may be configured to switch the display device to a lock mode and turn off the display unit based on the sensing information of the pressure sensor generated when the display unit is bent with respect to the bending portion so that a first screen region and a second screen region among the screen regions of the display unit are substantially parallel to each other.

The control unit may be further configured to control the display unit to display a type of the visual information used to release the lock mode of the display device based on a sensing signal of the pressure sensor generated when the bent display unit is then unbent with respect to the bending portion.

In another exemplary embodiment of the present invention, a method of controlling a display device is provided. The method includes sensing a first pressure applied when a display unit including a bending portion between screen regions that display visual information to a user is bent with respect to the bending portion, and controlling the visual information provided through the display unit based on sensing information.

The sensing of the first pressure may include sensing the first pressure applied to the bending portion when the display unit is bent.

The first pressure may be sensed by using a piezo resistance based sensor.

The controlling of the visual information may include matching a control operation corresponding to the sensing information by using previously stored data, and performing the control operation.

The controlling of the visual information may include controlling the display unit to display different types of the visual information on a first screen region and a second screen region of the screen regions of the display unit that is bent with respect to the bending portion so that a user recognizes the first screen region and the second screen region when the sensing information corresponds to the first pressure applied to the bending portion.

The method may further include: sensing a third pressure applied when the display unit that is bent with respect to the bending portion is then unbent with respect to the bending portion, and controlling the display unit to display on a combined said first screen region and said second screen region one of the different types of the visual information of an application being displayed on the first screen region when the sensing information corresponds to the third pressure applied to the bending portion when the bent display unit is then unbent to be flat.

The controlling of the visual information may include turning the display unit off when the sensing information corresponds to a second pressure applied to the bending portion when a first screen region and a second screen region among the screen regions of the display unit that is bent with respect to the bending portion are substantially parallel to each other.

The method may further include sensing a third pressure applied when the display unit that is bent with respect to the bending portion is then unbent with respect to the bending portion.

The method may further include controlling the display unit to display a type of the visual information used to release a lock mode of the display device when the sensing information corresponds to the third pressure applied to the bending portion.

BRIEF DESCRIPTION OF THE DRAWINGS

The above and other features and aspects of the present invention will become more apparent by describing in detail exemplary embodiments thereof with reference to the attached drawings in which:

FIGS. 2(a) and 2(b), shows perspective views of the display device of FIG. 1 when bent with respect to a bending portion, in which FIG. 2(a) is a perspective front view of the display device, and FIG. 2(b) is a perspective rear view of the display device;

FIGS. 5(a) and 5(b), shows perspective views of the display device of FIG. 4 when bent with respect to different bending portions;

DETAILED DESCRIPTION

Figure 1:
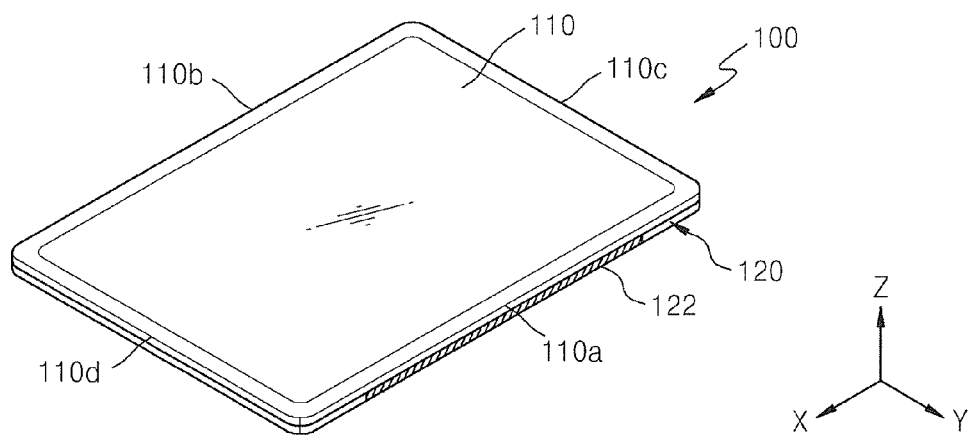
FIG. 1 is a schematic perspective view of a display device, according to an embodiment of the present invention.

As the numerous embodiments of the present invention allow for various changes, particular embodiments will be illustrated in the drawings and described in detail in the written description. However, this is not intended to limit the present invention to particular modes of practice, and it will be appreciated that all changes, equivalents, and substitutes that do not depart from the spirit and technical scope of the present invention are encompassed in the present invention. In the description of embodiments of the present invention, certain detailed explanations of related art that are well known to one of ordinary skill in the art may be omitted when they unnecessarily obscure the embodiments being described.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "comprising," "including," or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While such terms as "first," "second," etc., may be used to describe various components, such components must not be limited to the above terms. The above terms are used only to distinguish one component from another.

In the present specification, a display unit that bends with respect to a bending portion means that the display unit bends so that an internal angle formed by screen regions of the display unit disposed at both sides of the bending portion is a first angle or a second angle. The first angle is an angle by which a user visually recognizes all of the screen regions of the display unit disposed at both sides of the bending portion. The second angle is an angle by which the user does not visually recognize all of the screen regions of the display unit disposed at both sides of the bending portion.

In the present specification, a display unit that unbends with respect to a bending portion may mean that a bent display unit unbends to a flat state or that an internal angle formed by screen regions of the display unit disposed at both sides of the bent bending portion increases. Increasing the internal angle may mean that, for example, the internal angle formed by screen regions of the display unit disposed at both sides of the bending portion increases from about 20° to about 90°.

Figure 2:
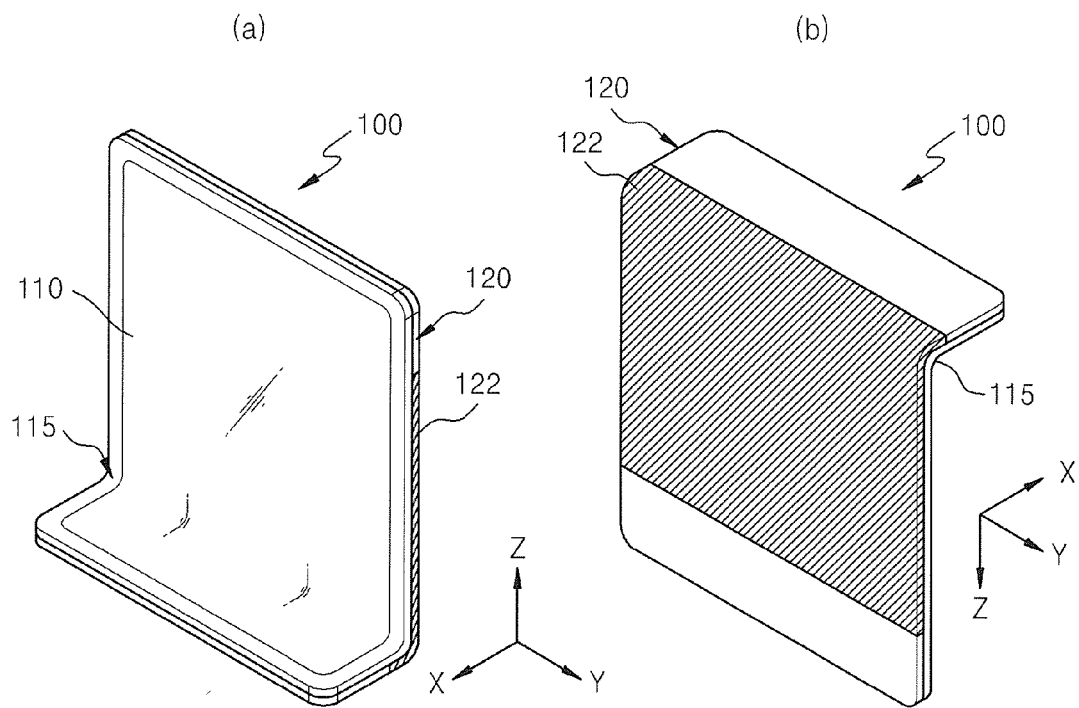
FIG. 2, which includes
Figure 3:
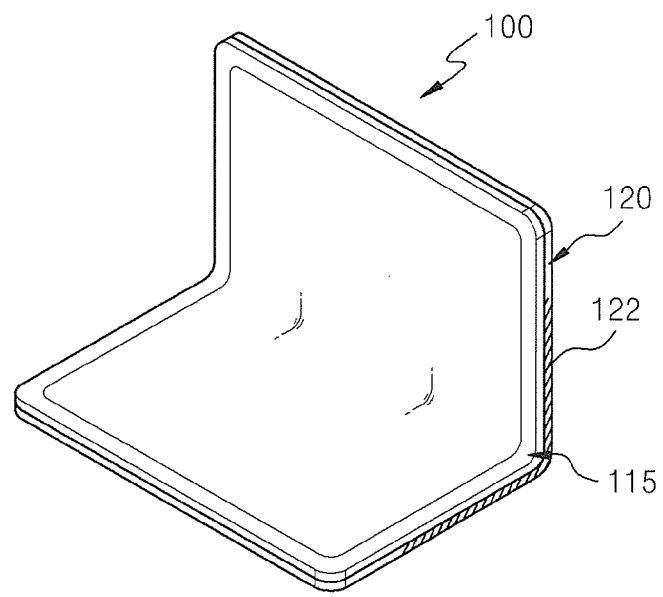
FIG. 3 is a perspective view of the display device of FIG. 1 that is bent with respect to another bending portion.

FIG. 1 is a schematic perspective view of a display device 100, according to an embodiment of the present invention. FIG. 2, which includes FIGS. 2(a) and 2(b), shows perspective views of the display device 100 of FIG. 1 when bent with respect to a bending portion 115, in which FIG. 2(a) is a perspective front view of the display device 100, and FIG. 2(b) is a perspective rear view of the display device 100. FIG. 3 is a perspective view of the display device 100 of FIG. 1 that is bent with respect to another bending portion 115.

Figure 6:
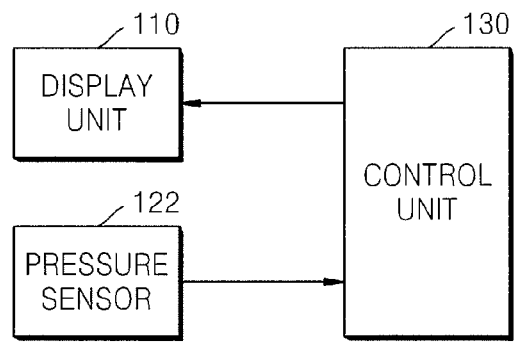
FIG. 6 is a schematic block diagram of a display device, according to an embodiment of the present invention.

Referring to FIGS. 1 through 3, the display device 100 includes a display unit 110, a pressure sensor 122, and a control unit (see FIG. 6). The display unit 110 outputs visual information activated according to a program or application executed in the display device 100 to a user through the front thereof. For example, the display unit 110 may be a flexible display and use a flexible organic light emitting diode (OLED) or a flexible liquid crystal display (LCD). The display unit 110 may recognize a touch (touch input). The display unit 110 may include first and second long side portions 110a and 110b extending in parallel, and first and second short side portions 110c and 110d extending approximately perpendicular to the first and second long side portions 110a and 110b. That is, the display unit 110 may be manufactured in an approximately rectangular shape.

The display unit 110 includes the bending portion 115 formed in at least one region thereof. The bending portion 115 may be formed across (i.e., spans) the display unit 110. For example, the bending portion 115 may extend from the first long side portion 110a to the second long side portion 110b, or from the first short side portion 110c to the second short side portion 110d. The display unit 110 bends with respect to the bending portion 115.

A rear surface of the display unit 110 may be formed of a bendable material such as a shape memory alloy. The display unit 110 may maintain a bending shape because of the shape memory alloy, and may be restored to a flat shape again.

The pressure sensor 122 may be disposed at a location corresponding to at least the bending portion 115. The pressure sensor 122 may exhibit a flexible characteristic, like the display unit 110, in such a way that the pressure sensor 122 may not be damaged by a shock applied when the display unit 110 is bent. For example, the pressure sensor 122 may be a film type (for example, a flexible film type) having a thickness of between several μm and several tens of μm.

The pressure sensor 122 may be disposed on the rear surface of the display unit 110 and may be formed in at least a region of a rear surface film 120. For example, the rear surface film 120 may be disposed in the rear surface of the display unit 110 to protect the rear surface of the display unit 110 and may include the pressure sensor 122 in a region corresponding to the bending portion 115. The pressure sensor 122 may be formed using a plurality of layers.

When the display unit 110 is bent with respect to the bending portion 115, a pressure is applied to the bending portion 115. The pressure sensor 122 corresponding to the bending portion 115 is affected by the pressure applied to the bending portion 115. The pressure sensor 122 generates an electrical signal corresponding to the applied pressure. For example, as the pressure is applied to the pressure sensor 122, materials forming the pressure sensor 122 are arranged in a direction, which may increase or decrease the thickness of the pressure sensor 122 and generate the electrical signal corresponding to the applied pressure.

The pressure applied to the bending portion 115 varies according to a bending degree of the display unit 110, and thus the pressure sensor 122 generates sensing information by sensing a pressure and reflecting its value. The sensing information generated by the pressure sensor 122 may then be transferred to the control unit as an electrical signal.

The pressure sensor 122 may use a piezo resistance method. As a non-limiting embodiment of the present invention, a piezo film sensor may be manufactured by using a material having an excellent electrical characteristic such as carbon nanotube or graphene. As another embodiment of the present invention, the pressure sensor 122 may include a capacitance-based pressure sensor 122.

According to the embodiment of FIGS. 2(a) and 2(b), although the display unit 110 is bent at a point of approximately ⅓ of the first and second short side portions 110c and 110d, the present invention is not limited thereto. As another embodiment of the present invention, as shown in FIG. 3, the display unit 110 may be bent at a point of approximately ½ of the first and second short side portions 110c and 110d. The display unit 110 is bent with respect to the bending portion 115 including the pressure sensor 122, but the bending location need not be specifically limited.

According to the embodiments of FIGS. 1 through 3, the pressure sensor 122 is formed in a region of the rear surface film 120, but the present invention is not limited thereto. As another embodiment of the present invention, the pressure sensor 122 may be formed in the overall rear surface film 120. Thus, even though the display unit 110 is bent, the pressure sensor 122 may recognize bending of the display unit 110 at any desired location.

The control unit may be embedded in the display device 100 and control the visual information output through the display unit 110 based on the sensing information transferred from the pressure sensor 122. As described above, the sensing information generated by the pressure sensor 122 may have various values according to the bending degree of the display unit 110. The control unit may control the display unit 110 to output various pieces of visual information based on the sensing information having various values. A detailed control operation of the control unit will be described later with reference to FIGS. 6 through 11.

Figure 4:
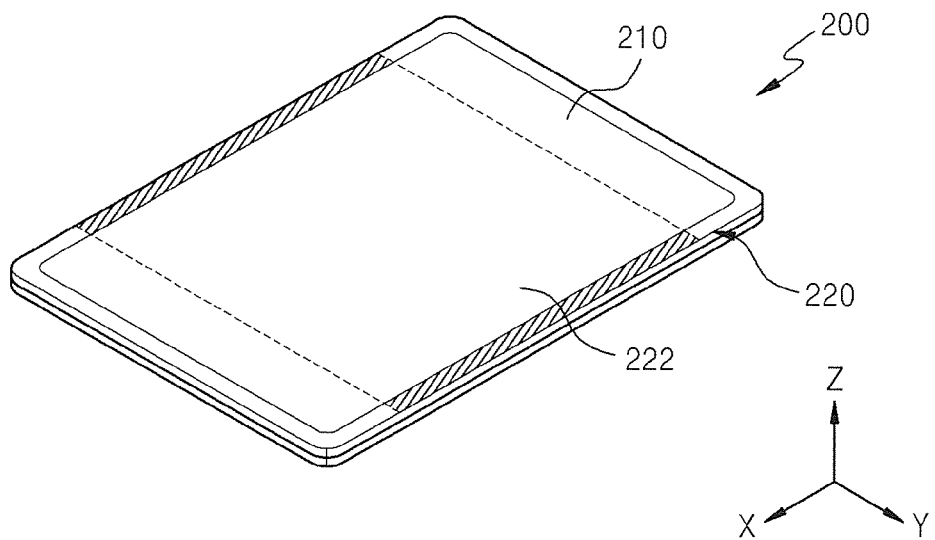
FIG. 4 is a schematic perspective view of a display device, according to another embodiment of the present invention.
Figure 5:
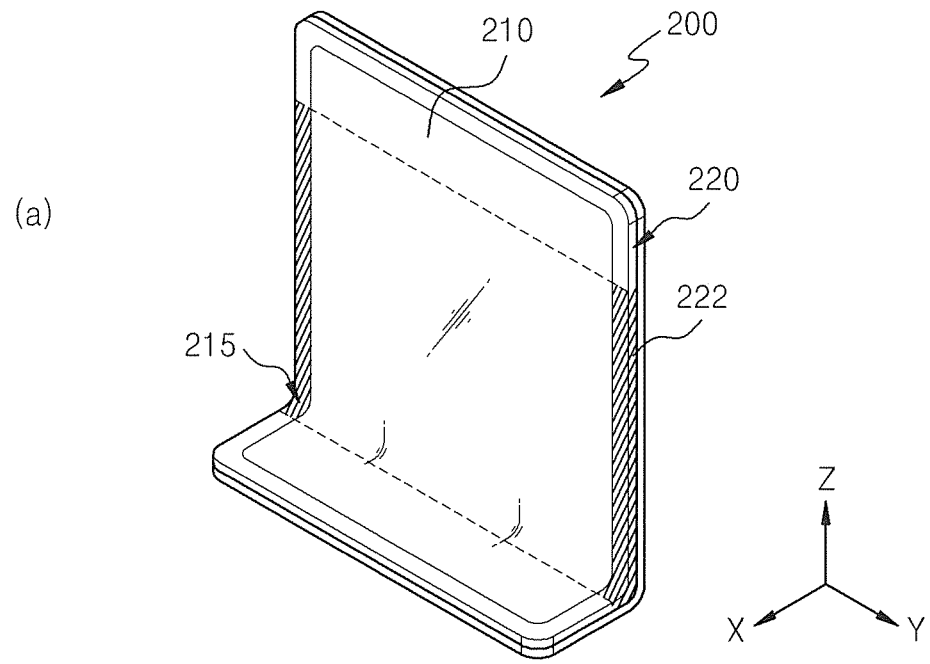
FIG. 5, which includes
Figure 5:
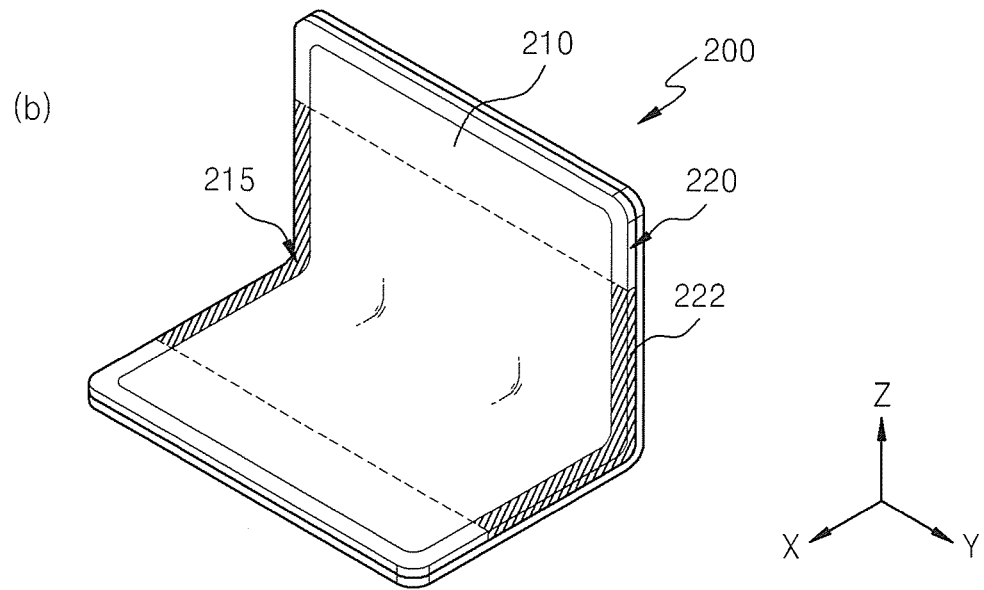

FIG. 4 is a schematic perspective view of a display device 200, according to another embodiment of the present invention. FIG. 5, which includes FIGS. 5(a) and 5(b), shows perspective views of the display device 200 of FIG. 4 when bent with respect to different bending portions 215.

Referring to FIGS. 4 and 5, the display device 200 includes a display unit 210, a pressure sensor 222, and a control unit (see FIG. 6). The basic operations of the display unit 210, the pressure sensor 222, and the control unit are the same or similar to those described with reference to the display device 100 of FIGS. 1 through 3.

Although the pressure sensor 122 is disposed on the rear surface of the display unit 110 in the display device 100 described with reference to FIGS. 1 through 3, the pressure sensor 222 according to the embodiments of FIGS. 4 and 5 is disposed on a front surface of the display unit 210. For descriptive convenience, descriptions of the same or similar constructions between the embodiments of FIGS. 1 through 3 and the embodiments of FIGS. 4 and 5 are replaced by the descriptions given above, and differences therebetween will now be described below.

Referring to FIG. 4, the pressure sensor 222 is disposed at a location corresponding to at least the bending portion 215 on a front surface of the display unit 210. The pressure sensor 222 may exhibit a flexible characteristic, like the display unit 210, in such a way that the pressure sensor 222 is not damaged by a shock applied when the display unit 210 is bent. For example, the pressure sensor 222 may be a film type (for example, a flexible film type) and may be disposed in a region of a front surface film 220.

The front surface film 220 may be disposed on the front surface of the display unit 210 to protect the front surface of the display unit 210, and may include the pressure sensor 222 formed in a region of the front surface film 220, i.e., in a region corresponding to at least the bending portion 215. When the display unit 210 is bent with respect to the bending portion 215, a pressure is applied to the bending portion 215. The pressure sensor 222 formed at the location corresponding to the bending portion 215 recognizes the pressure applied to the bending portion 215. The pressure sensor 222 converts sensing information reflecting the recognized pressure into a set electrical signal (for example, a predetermined electrical signal) and transfers the electrical signal to the control unit.

According to the display device 200 of the present embodiment, the pressure sensor 222 is disposed in the front surface of the display unit 210, and thus the pressure sensor 222 may exhibit a transparent characteristic so that the pressure sensor 222 does not prevent the display unit 210 from outputting visual information. For example, the pressure sensor 222 may include a piezo resistance based piezo film sensor manufactured by using carbon nanotubes or graphene having excellent electrical characteristic and the transparent characteristic.

As shown in FIG. 5(a), the display unit 210 is bent at a point of approximately ⅓ of short side portions or, as shown in FIG. 5(b), at a point of approximately ½ of long side portions. The display unit 210 may be bent with respect to the bending portion 215 including the pressure sensor 222, but the bending location is not specifically limited.

According to the embodiments of FIGS. 4 and 5, the pressure sensor 222 is formed in a region of the front surface film 220, but the present invention is not limited thereto. As another embodiment of the present invention, the pressure sensor 222 may be formed in the overall front surface film 220. Thus, even though the display unit 210 is bent, the pressure sensor 222 may recognize bending of the display unit 210 at any desired location.

FIG. 6 is a schematic block diagram of a display device, according to an embodiment of the present invention.

Referring to FIG. 6, a control unit 130 receives sensing information from the pressure sensor 122 and controls the display unit 110 based on the received sensing information. For example, the control unit 130 may control the display unit 110 based on a pressure applied to the bending portion 115 according to a bending degree of the display unit 110.

When the display unit 110 is bent with respect to the bending portion 115, the pressure applied to the bending portion 115 may vary according to the bending degree of the display unit 110. A value of the pressure applied to the bending portion 115 may be reflected in sensing information of the pressure sensor 122 obtained by sensing the pressure applied to the bending portion 115.

The control unit 130 may include a database to control the display unit 110. A control operation of the control unit 130 may be based on the accessed content of the database. The database may be accessed from the control unit 130 based on the pressure applied to the bending portion 115 and a program being executed on the control unit 130 (or other unit or processor of the display device 100) to control the display unit 110. Accordingly, a detailed control operation of the display device 100 may be changeable according to the pressure applied to the bending portion 115 and a program being executed on the control unit 130 to control the display unit 110.

For example, when bending the display unit 110 with respect to the bending portion 115, the pressure sensor 122 may transfer the sensing information obtained by sensing the pressure applied to the bending portion 115 to the control unit 130. Then, the control unit 130 may control the display unit 110 according to a result obtained by matching the sensing information received from the pressure sensor 122 with the stored data.

Visual information displayed on the display unit 110 according to a control operation of the control unit 130 will now be described in more detail with reference to FIGS. 7 through 11.

FIGS. 7 through 11 are schematic views of visual information displayed on the display unit 110 of the display device 100 of FIGS. 1 through 3, according to different embodiments of the present invention.

Figure 7:
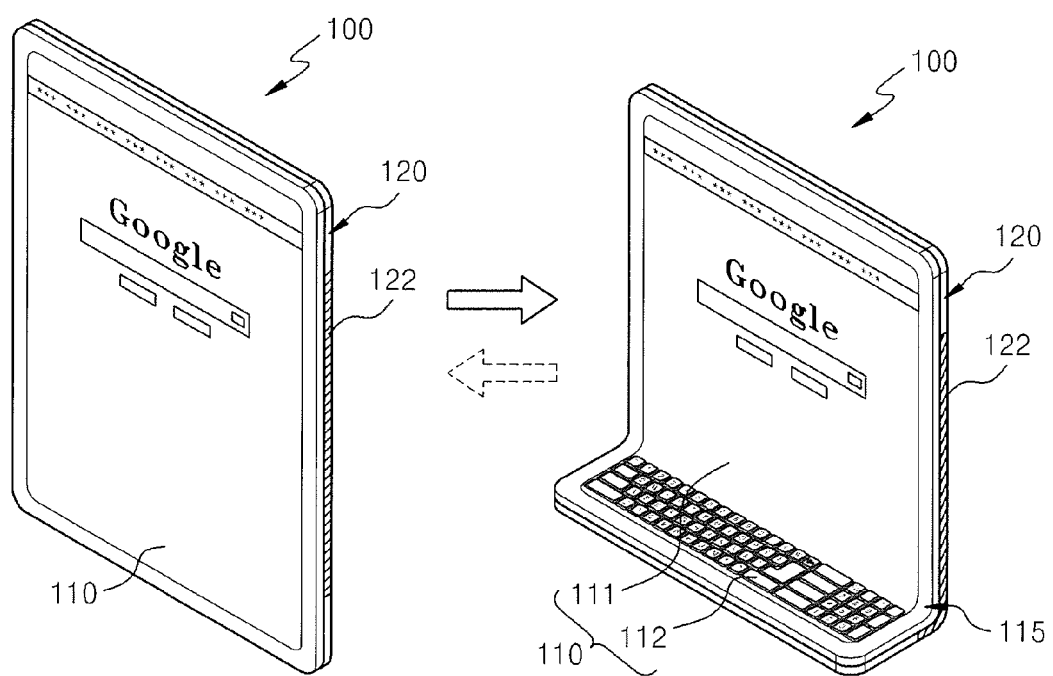
FIG. 7 is a schematic view of a change of visual information displayed on the display unit of the display device of FIGS. 1 through 3 when bending the display device, according to an embodiment of the present invention, in which the visual information is a web browser with a keyboard.

Referring to the left view of FIG. 7, the display unit 110 in a flat status outputs the visual information of a web browser (or other application) on an overall screen region. In the right view of FIG. 7, when bending the display unit 110 that is in the flat status with respect to the bending portion 115, the pressure sensor 122 senses a pressure applied to the bending portion 115.

For example, when the display unit 110 is bent in such a way that first and second screen regions 111 and 112 disposed at both sides of the bending portion 115 form a first angle, a first pressure is applied to the bending portion 115 by the corresponding first angle. The pressure sensor 122 generates a first sensing signal by sensing the first pressure and reflecting the first pressure's value, and then transfers the generated first sensing signal to the control unit 130.

The control unit 130 may then perform a first control operation obtained by matching the received first sensing signal with previously stored data. For example, the control unit 130 may transfer a first control signal to the display unit 110 to perform the first control operation. The display unit 110 then provides the first and second screen regions 111 and 112 disposed at both sides of the bending portion 115 with different types of visual information based on the first control signal as shown in the right view of FIG. 7.

For example, as illustrated in the right view of FIG. 7, the first screen region 111 disposed at one side of the bending portion 115 outputs a (possibly size- or resolution-reduced) web browser similar to or identical to the web browser displayed before the display unit 110 was bent, and the second screen region 112 disposed at another side of the bending portion 115 outputs a control screen, in this case a virtual keyboard to manipulate, i.e., to control, the web browser. A user may input a keyword into the web browser output on the first screen region 111 by touching the virtual keyboard output on the second screen region 112.

As another embodiment of the present invention, when unbending the display unit 110 that is bent with respect to the bending portion 115, the pressure sensor 122 senses a pressure applied to the bending portion 115. When unbending the display unit 110, the pressure applied to the bending portion 115 may be different from the pressure applied when bending the display unit 110. For example, when bending the display unit 110, a bending moment applied to the bending portion 115 may result from a compression force, whereas, when unbending the display unit 110, a bending moment applied to the bending portion 115 may result from a tensile force.

For example, since the bent display unit 110 is unbent to the flat status to form an angle of approximately 180°, a second pressure different from the first pressure is applied to the bending portion 115. The pressure sensor 122 generates a second sensing signal by sensing the second pressure and reflecting the second pressure's value, and then transfers the generated second sensing signal to the control unit 130.

The control unit 130 may then perform a second control operation obtained by matching the received second sensing signal with the previously stored data. The control unit 130 may, for example, transfer a second control signal to the display unit 110 to perform the second control operation. The display unit 110 may output the visual information of the web browser on the overall screen region again (for example, by magnifying or enlarging the image displayed on the first screen region 111) based on the second control signal, as illustrated in the left view of FIG. 7.

According to the description provided above, although the visual information display on the display unit 110 is the web browser, the visual information is not limited to the web browser. For example, the visual information may be a photo as image information as shown in FIG. 8, or a slide (for example, a presentation slide) as shown in FIG. 9.

Figure 8:
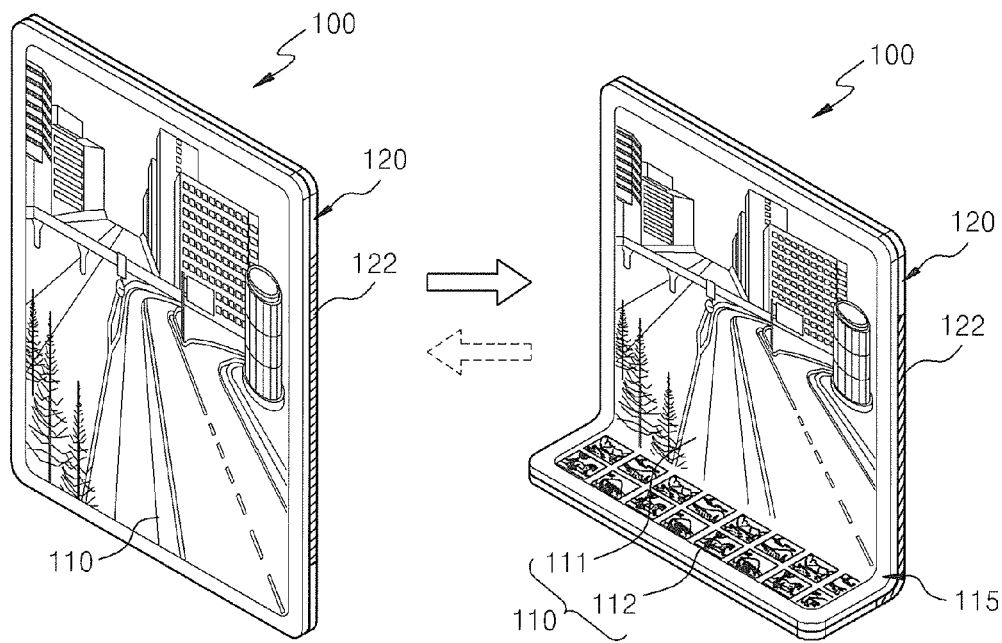
FIG. 8 is a schematic view of a change of visual information displayed on the display unit of the display device of FIGS. 1 through 3 when bending the display device, according to another embodiment of the present invention, in which the visual information is a photo with thumbnail images of photos.
Figure 9:
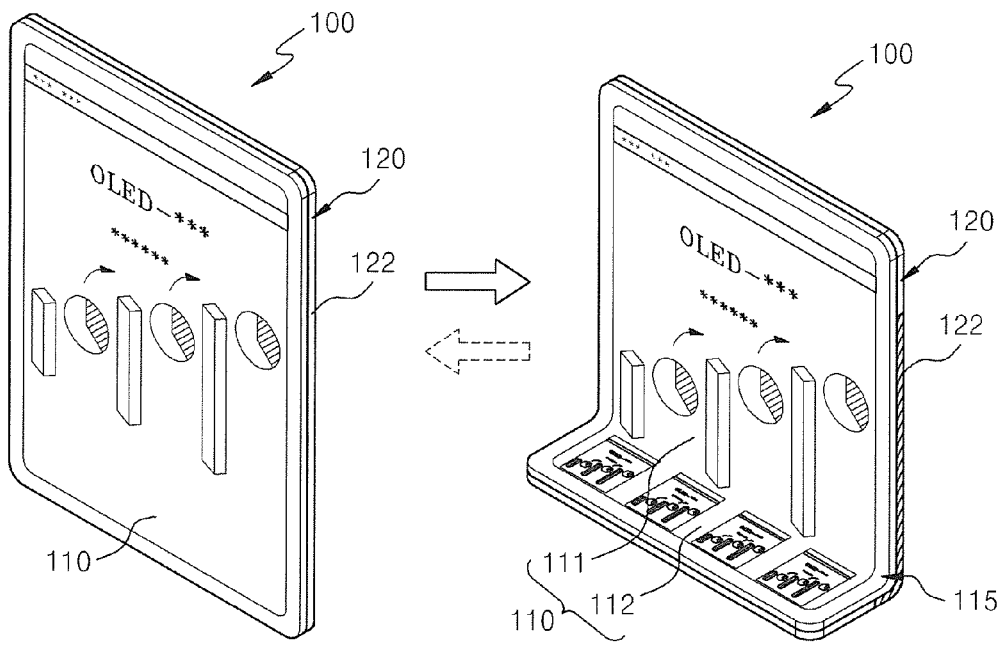
FIG. 9 is a schematic view of a change of visual information displayed on the display unit of the display device of FIGS. 1 through 3 when bending the display device, according to another embodiment of the present invention, in which the visual information is a slide (for example, a presentation slide) with thumbnail images of slides.

FIG. 8 is a schematic view of a change of visual information displayed on the display unit 110 of the display device of FIGS. 1 through 3, according to another embodiment of the present invention, in which the visual information is a photo with thumbnail images of photos. FIG. 9 is a schematic view of visual information that is a slide (for example, a presentation slide) with thumbnail images of slides.

As described with reference to FIG. 7 above, the pressure sensor 122 may output first sensing information as the display unit 110 is bent. The control unit 130 that receives the first sensing information may provide the first and second screen regions 111 and 112 disposed at both sides of the bending portion 115 with different types of visual information in terms of a type of the visual information displayed on the display unit 110.

For example, referring to FIG. 8, when the visual information displayed on the display unit 110 is a photo (or other document), the first screen region 111 may output a (possibly size- or resolution-reduced) photo similar to or the same as the photo output before the display unit 110 was bent, and the second screen region 112 may output other photos stored in a folder (and including the photo displayed on the first screen region 111) as thumbnail images (or, for example, other images that represent a summary of content of what is or what can be displayed in the first screen region 111).

As another embodiment, referring to FIG. 9, when the visual information displayed on the display unit 110 is a presentation slide, the first screen region 111 may output a (possibly size- or resolution-reduced) slide similar to or the same as the slide output before the display unit 110 was bent, and the second screen region 112 may output other slides stored in a folder (including the slide displayed on the first screen region 111) as thumbnail images.

As another embodiment, when unbending the display unit 110 that is bent with respect to the bending portion 115, the photo or slide displayed on the first screen region 111 may be output on an overall screen region of the display unit 110 as described above.

Figure 10:
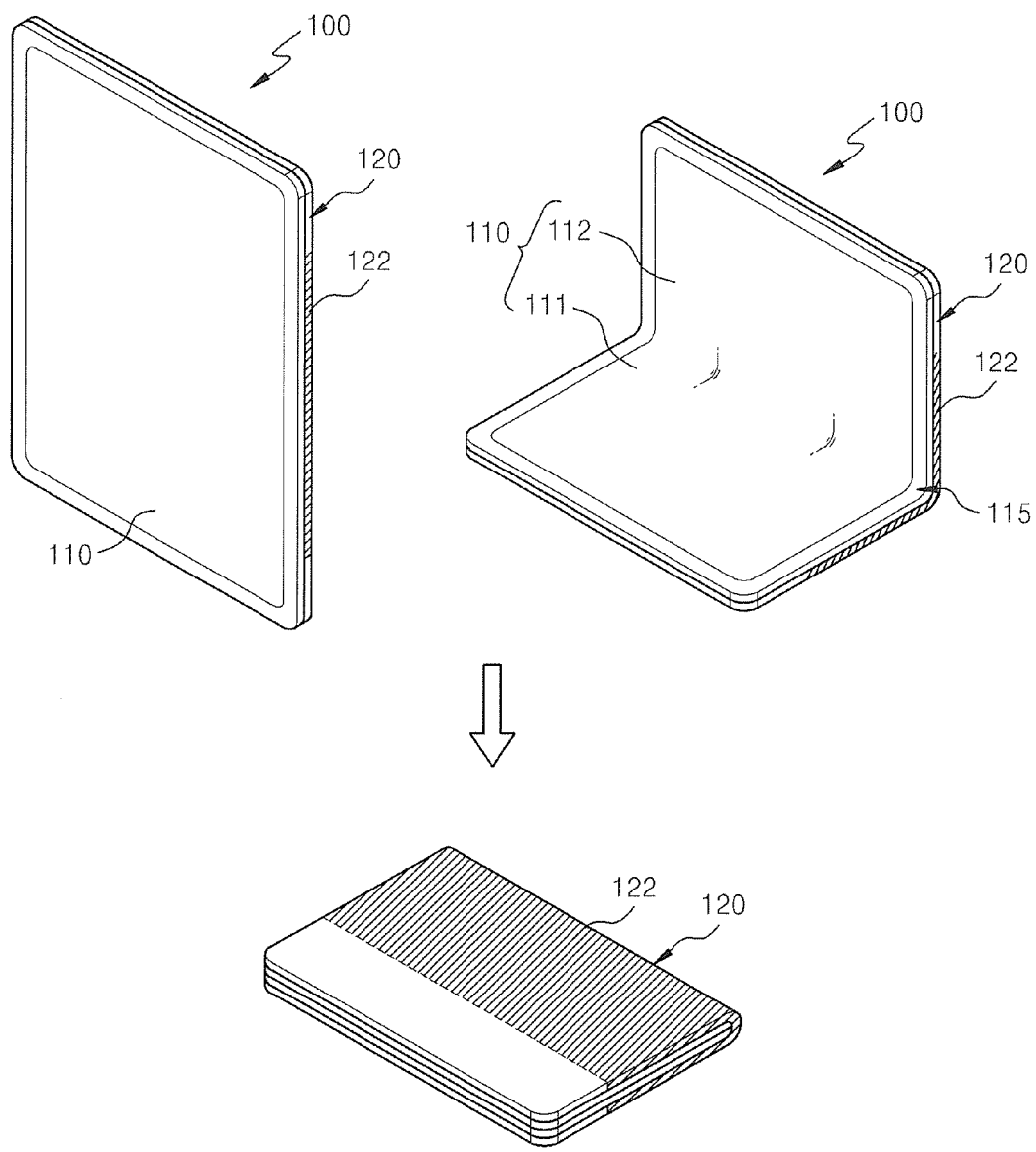
FIG. 10 is a schematic view of visual information displayed on the display unit of the display device of FIGS. 1 through 3 when bending the display device, according to another embodiment of the present invention, in which the display unit is turned off.

FIG. 10 is a schematic view of visual information displayed on the display unit 110 of the display device 100 of FIGS. 1 through 3, according to another embodiment of the present invention, in which the display unit 110 is turned off.

Referring to FIG. 10, when the display unit 110 is in a flat status (upper left view of FIG. 10) or the display unit 110 is bent with respect to the bending portion 115 (upper right view of FIG. 10), the display unit 110 may be bent in such a way (e.g., folded in half) that the first and second screen regions 111 and 112 disposed at both sides of the bending portion 115 form a second angle of roughly 0°, i.e., are substantially parallel to (and not coplanar with) each other (lower view of FIG. 10). In this case, a third pressure different from the first and second pressures described with reference to FIG. 7 above is applied to the bending portion 115. The pressure sensor 122 generates a third sensing signal by sensing the third pressure and reflecting the third pressure's value, and then transfers the generated third sensing signal to the control unit 130.

The control unit 130 may perform a third control operation obtained by matching the received third sensing signal with previously stored data. For example, the control unit 130 may transfer a third control signal to the display unit 110 to perform the third control operation. The display unit 110 may then be turned off based on the third control signal as shown in the bottom view of FIG. 10. At the same time, the display device 100 may be switched to a lock mode.

Figure 11:
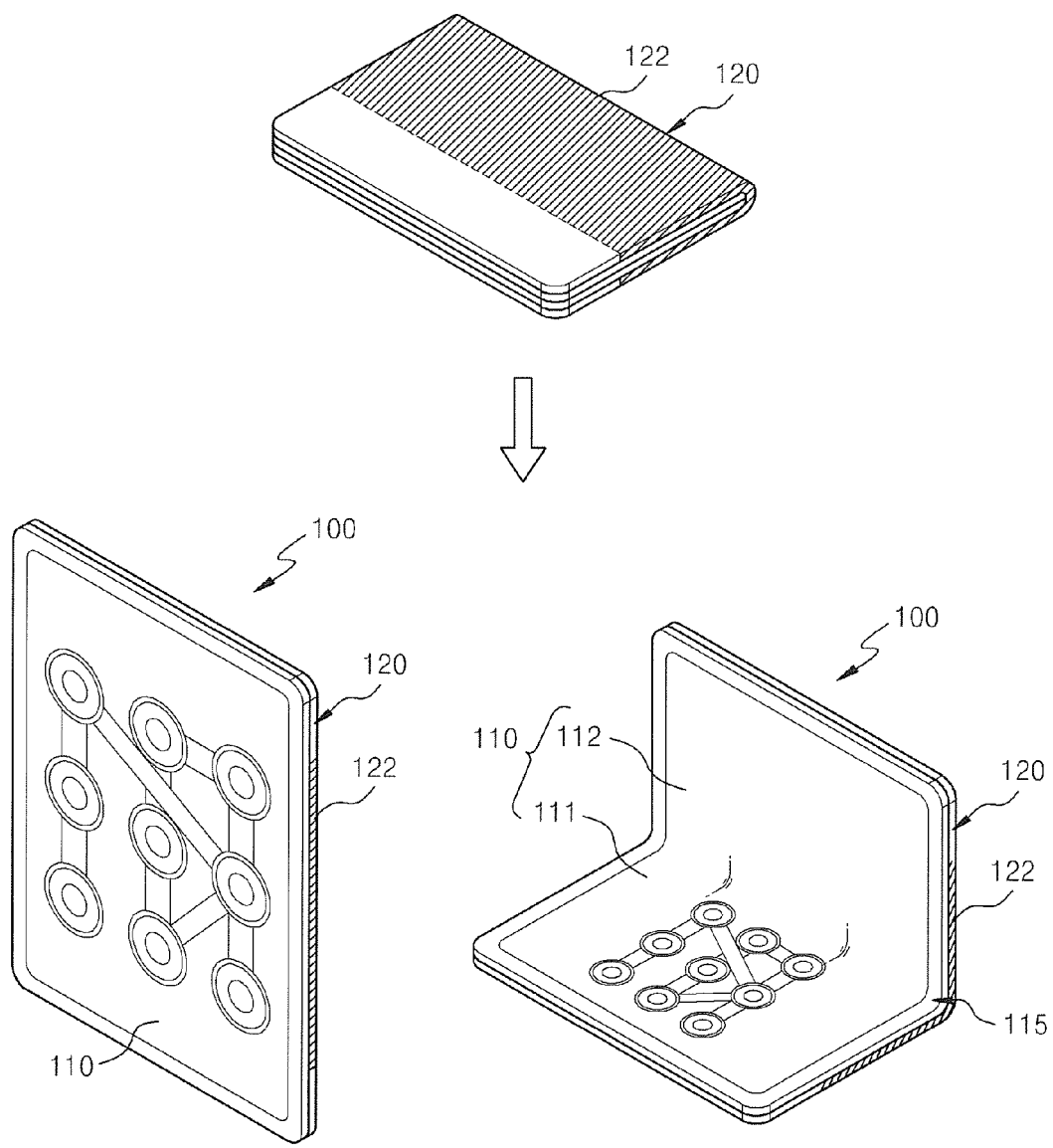
FIG. 11 is a schematic view of visual information displayed on the display unit of the display device of FIGS. 1 through 3 when unbending the display device that is bent with respect to a bending portion of FIG. 10 occurs, according to another embodiment of the present invention.

FIG. 11 is a schematic view of visual information displayed on the display unit 110 of the display device 100 of FIGS. 1 through 3 when unbending the display device 100 that is bent with respect to the bending portion 115 of FIG. 10, according to another embodiment of the present invention.

Referring to FIG. 11, when unbending the display unit 110 that is bent with respect to the bending portion 115 that is substantially parallel to the first and second screen regions 111 and 112 (e.g., unbending a folded display device 100, as illustrated in the top view of FIG. 11), the pressure sensor 122 senses a pressure applied to the bending portion 115. The pressure applied to the bending portion 115 when unbending the display unit 110 may be different from the pressure applied when bending the display unit 110 described with reference to FIG. 10. For example, when bending the display unit 110, a bending moment applied to the bending portion 115 may result from a compression force, whereas, when unbending the display unit 110, a bending moment applied to the bending portion 115 may result from a tensile force.

Since the bent display unit 110 is unbent, a fourth pressure different from the third pressure described with reference to FIG. 10 is applied to the bending portion 115. The pressure sensor 122 generates a fourth sensing signal by sensing the fourth pressure and reflecting the fourth pressure's value, and then transfers the generated fourth sensing signal to the control unit 130.

The control unit 130 may perform a fourth control operation obtained by matching the received fourth sensing signal with previously stored data. For example, the control unit 130 may transfer a fourth control signal to the display unit 110 to perform the fourth control operation. The display unit 110 may then output a screen to release a lock mode of the display device 100 that is in the lock mode based on the fourth control signal. This output may fill the entire screen when the display unit 110 is flat (as illustrated in the lower left view of FIG. 11 or one of the screen regions, such as the first screen region 111 (as illustrated in the lower right view of FIG. 11).

As described above, according to an embodiment of the present invention, a bending degree of a display unit with respect to a bending portion is obtained by using a pressure sensor, thereby sensing a pressure (for example, precisely sensing a pressure) applied to the bending portion. When bending the display unit with respect to the bending portion, different types of visual information may be output on screen regions disposed at both sides of the bending portion. Output of various types of visual information may be controlled based on the pressure applied to the bending portion according to the bending degree of the display unit, thereby providing a better user experience.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A display device comprising:
a display unit for displaying visual information to a user on an overall screen region, and being configured to bend with respect to a bending portion between screen regions of the overall screen region that display the visual information;
a pressure sensor at a location corresponding to the bending portion, and being configured to sense a first pressure applied to the bending portion when the display unit is bent with respect to the bending portion; and
a control unit for controlling the visual information provided through the display unit based on sensing information transferred from the pressure sensor,
wherein when the display is bent such that a size of a first screen region at a side of the bending portion is different from that of a second screen region at an other side of the bending portion, the pressure sensor is configured to generate a first sensing signal corresponding to a bending angle of the display, the control unit is configured to receive the first sensing signal, to match the first sensing signal with data stored in a database of the control unit, and to transmit a first control signal to the display unit, and the display unit is configured to display different kinds of the visual information on the first screen region and the second screen region based on the first control signal, wherein when the display is unbent with respect to the bending portion, the pressure sensor is configured to generate a second sensing signal different from the first sensing signal and corresponding to the display being unbent, the control unit is configured to receive the second sensing signal, to match the second sensing signal with the data stored in the database of the control unit, and to transmit a second control signal to the display unit, and the display unit is configured to select visual information from the different kinds of the visual information displayed on the first and second screen regions based on the second control signal and to display the selected visual information on the overall screen region, and wherein when the display unit is bent with respect to the bending portion so that a first screen region and a second screen region among the screen regions of the display unit are substantially parallel to and not coplanar with each other, the pressure sensor is configured to generate a third signal different from the first and second sensing signals, the control unit is configured to receive the third signal, to match the third signal with the data stored in the database of the control unit, and to transmit a third control signal to the display unit, and the display unit is configured to turn off and to switch the display device to a lock mode based on the third control signal, wherein the pressure sensor comprises a capacitive-based pressure sensor.

2. The display device of claim 1, wherein the pressure sensor is a flexible film pressure sensor.

3. The display device of claim 2, wherein the pressure sensor is transparent.

4. The display device of claim 1, wherein the bending portion spans the display unit.

5. The display device of claim 1, wherein the pressure sensor is further configured to sense a second pressure applied when the display unit that is bent with respect to the bending portion is then unbent with respect to the bending portion.

6. The display device of claim 1, wherein the control unit is further configured to control the display unit to display a control screen on the second screen region that is used to manipulate an application being displayed on the first screen region, or to display a thumbnail image on the second screen region that is a summary of content related to a document being displayed on the first screen region.

7. The display device of claim 1, wherein the control unit is further configured to control the display unit to display a type of the visual information used to release the lock mode of the display device based on a sensing signal of the pressure sensor generated when the bent display unit is then unbent with respect to the bending portion.

8. The display device of claim 1, wherein the size of the first screen region is greater than that of the second screen region, and when the display is unbent with respect to the bending portion, the control unit is configured to select the visual information displayed on the first screen region, and to control the display unit to display the visual information on the overall screen region.

9. A method of controlling a display device, the method comprising:

sensing, by a pressure sensor of the display device, a first pressure applied when a display unit comprising a bending portion between screen regions that display visual information to a user is bent with respect to the bending portion; and controlling, by a control unit of the display device, the visual information provided through the display unit based on sensing information, wherein when the display is bent such that a size of a first screen region at a side of the bending portion is different from that of a second screen region at an other side of the bending portion, the pressure sensor is configured to generate a first sensing signal corresponding to a bending angle of the display, the control unit is configured to receive the first sensing signal, to match the first sensing signal with data stored in a database of the control unit, and to transmit a first control signal to the display unit, and the display unit is configured to display different kinds of the visual information on the first screen region and the second screen region based on the first control signal, wherein when the display is unbent with respect to the bending portion, the pressure sensor is configured to generate a second sensing signal different from the first sensing signal and corresponding to the display being unbent, the control unit is configured to receive the second sensing signal, to match the second sensing signal with the data stored in the database of the control unit, and to transmit a second control signal to the display unit, and the display unit is configured to select visual information from the different kinds of the visual information displayed on the first and second screen regions based on the second control signal and to display the selected visual information on an overall screen region, and wherein when the display unit is bent with respect to the bending portion so that a first screen region and a second screen region among the screen regions of the display unit are substantially parallel to and not coplanar with each other, the pressure sensor is configured to generate a third signal different from the first and second sensing signals, the control unit is configured to receive the third signal, to match the third signal with the data stored in the database of the control unit, and to transmit a third control signal to the display unit, and the display unit is configured to turn off and to switch the display device to a lock mode based on the third control signal, wherein the pressure sensor comprises a capacitive-based pressure sensor.

10. The method of claim 9, wherein the sensing of the first pressure comprises sensing the first pressure applied to the bending portion when the display unit is bent.

11. The method of claim 9, wherein the controlling of the visual information comprises:

matching a control operation corresponding to the sensing information by using previously stored data; and performing the control operation.

12. The method of claim 9, further comprising sensing, by the pressure sensor, a second pressure applied when the display unit that is bent with respect to the bending portion is then unbent with respect to the bending portion.

13. The method of claim 12, further comprising controlling, by the control unit, the display unit to display a type of the visual information used to release a lock mode of the display device when the sensing information corresponds to the second pressure applied to the bending portion.

14. The method of claim 9, wherein the size of the first screen region is greater than that of the second screen region, and further comprising:

sensing, by the pressure sensor, a second pressure applied when the display unit that is bent with respect to the bending portion is then unbent with respect to the bending portion;

selecting, by the control unit, the visual information displayed on the first screen region; and controlling, by the control unit, the display unit to display the visual information on the overall screen region.

\* \* \* \* \*